United States Patent
Fanson

(10) Patent No.: US 7,920,588 B2
(45) Date of Patent: Apr. 5, 2011

(54) DATA COMMUNICATIONS SYSTEM AND METHOD OF DATA TRANSMISSION

(75) Inventor: John Fanson, Ottawa (CA)

(73) Assignee: Edgewater Computer Systems, Inc. (CA)

( * ) Notice: Subject to any disclaimer, the term of this patent is extended or adjusted under 35 U.S.C. 154(b) by 1173 days.

(21) Appl. No.: 11/419,742

(22) Filed: May 22, 2006

(65) Prior Publication Data

US 2007/0268973 A1     Nov. 22, 2007

(51) Int. Cl.
*H04L 12/42* (2006.01)
*H04J 11/00* (2006.01)

(52) U.S. Cl. .................................. 370/451; 370/203
(58) Field of Classification Search .................. 370/221, 370/225–228, 362, 364–365, 402–403, 423, 370/438, 451, 465, 467, 469, 489, 490; 375/257, 375/259, 260
See application file for complete search history.

(56) References Cited

U.S. PATENT DOCUMENTS

| | | | | |
|---|---|---|---|---|
| 4,251,886 A | | 2/1981 | Roza | 375/290 |
| 5,453,737 A | * | 9/1995 | Opoczynski | 340/2.8 |
| 6,188,718 B1 | | 2/2001 | Gitlin et al. | 375/148 |
| 6,741,711 B1 | | 5/2004 | Sibbald | 381/310 |
| 6,813,352 B1 | | 11/2004 | Duttweiler | 379/406.8 |
| 6,823,100 B1 | | 11/2004 | Roemerman | 385/18 |
| 6,847,702 B1 | * | 1/2005 | Czerwiec et al. | 379/29.01 |
| 7,092,452 B2 | | 8/2006 | Taylor et al. | 375/267 |
| 7,254,158 B2 | | 8/2007 | Agrawal | 375/136 |
| 7,356,389 B2 | * | 4/2008 | Holst et al. | 701/3 |
| 7,483,450 B1 | | 1/2009 | Giese et al. | 370/507 |
| 2003/0018840 A1 | | 1/2003 | Chandler et al. | 710/100 |
| 2003/0081763 A1 | | 5/2003 | Tang et al. | 379/406.01 |
| 2003/0123584 A1 | | 7/2003 | Siegel et al. | 375/350 |
| 2003/0169832 A1 | | 9/2003 | Schmidt et al. | 375/340 |
| 2003/0189999 A1 | | 10/2003 | Kadous | 375/349 |
| 2003/0223354 A1 | * | 12/2003 | Olszewski | 370/208 |
| 2004/0013131 A1 | | 1/2004 | Owens et al. | 370/466 |
| 2004/0205285 A1 | * | 10/2004 | Kinstler | 710/315 |
| 2004/0208266 A1 | | 10/2004 | Lenosky | 375/346 |
| 2004/0229615 A1 | | 11/2004 | Agrawal | 455/436 |
| 2005/0281364 A1 | | 12/2005 | Pavan | 375/350 |
| 2006/0101184 A1 | * | 5/2006 | Hegarty | 710/307 |
| 2007/0291881 A1 | | 12/2007 | Glass | 375/346 |
| 2008/0059202 A1 | | 3/2008 | You | 704/500 |

OTHER PUBLICATIONS

Graber, Bryan, "The Use of Discrete Multi-Tone (DMT) Signaling for Data Transmissions on Existing AS15531 Networks", White Paper on DMT Technology, Aug. 15, 1998.

(Continued)

*Primary Examiner* — Hanh Nguyen
(74) *Attorney, Agent, or Firm* — Hayes Soloway P.C.

(57) ABSTRACT

A 1553 data communication system having a primary data bus, a redundant data bus and a non-1553 data communication overlay system is provided. The non-1553 data communication overlay system comprises a non-1553 bus controller terminal and a non-1553 remote terminal. Each non-1553 terminal includes a non-1553 transmitter block connected to the primary bus and the redundant bus for sending non-1553 signals, a non-1553 receiver block for receiving non-1553 signals and a non-1553 receive path selection block. The non-1553 receive path selection block selectively establishes a receive path between the primary data bus or the redundant data bus and the non-1553 receiver block according to predefined receive path selection criteria. A 1553 data communication method is also provided.

14 Claims, 8 Drawing Sheets

OTHER PUBLICATIONS

Adams, Charlotte, "Product Focus: 1553, Still a Key Standard", Aviation Today, Dec. 1, 2000. www.aviationtoday.com/cgi/av/show_mag.cgi?pub=av&mon=1200&file=1200productfocus.htm.

Keller, John, "Rebirth of the 1553 databus", Military & Aerospace Electronics, Feb. 2006. http://mae.pennnet.com/Articles/Article_Display.cfm?Section=ARTCL&ARTICLE_ID=248183&VERSION_NUM=2&p=32.

Graber, Bryan, The Use of Discrete Multi-Tone (DMT) Signaling for Data Transmissions on Esistin AS15531 Networks; White Paper on DMT Technology, Aug. 15, 1998.

Adams Charlotte, "Product Focus: 1553, Still a Key Standard", Aviation Today, Dec. 1, 2000. www.aviationtoday.com/cgi/av/show_mag.cgi?pub=av&mon=1200&file=1200productfocus.htm.

Komodromos, "Design of FIR Filters with Complex Desired Frequency Response Using a Generalized Remez Algorithm," IEEE transactions on circuits and systems-11:analog and digital signal processing, vol. 42, No. 4, Apr. 1995 pp. 274-278.

Khosravi, "Implementation of linear digital filters bases on morphological representation theory", IEEE transactions on signal processing vol. 42 No. 9 Sep. 1994 pp. 2264-2275.

Ying, "Identification of Stable Linear Systems Using Polynomial Kernels", Ind. Eng. Chem. Res., 1999, 38 (12), pp. 4712-4728, Publication Date (Web): Nov. 16, 1999 American Chemical Society.

Zoltowski, "On the use of basis functions in blind equalization based on deterministic least squares," Conference Record of the Thirty First Asilomar Conference on Signals, Systems & Computers, 1997, vol. 1 Publication Year: 1997, pp. 816-822 vol. 1.

Akcay, "Rational basis functions for robust identification from frequency and time domain measurements," Proceedings of the 1998 American Control Conference, 1998, vol. 6 Publication Year: 1998, pp. 3559-3563 vol. 6.

USPTO Office Action dated Apr. 29, 2010.

\* cited by examiner

DATA COMMUNICATIONS SYSTEM AND METHOD OF DATA TRANSMISSION

CROSS-REFERENCE TO RELATED APPLICATIONS

This application is related to U.S. patent application Ser. No. 11/332,395, entitled "Approximate Linear FM Synchronization Symbols for a Bandwidth Configurable OFDM Modem", filed on Jan. 18, 2006, which is incorporated here by reference.

FIELD OF INVENTION

The present invention relates to data transmission over MIL-STD-1553 communications systems and more particularly to an overlay communication system over existing MIL-STD-1553 communication systems and associated method.

BACKGROUND OF THE INVENTION

The AS15531 databus, also known as MIL-STD-1553 or simply 1553, is an approximately 30 year old technology that defines the electrical and signaling characteristics for 1 Mbps communications over an asynchronous serial, command/response digital data bus on which messages are time division multiplexed among users. The transmission medium is a twisted wire cable pair. 1553 specifies all of the electrical characteristics of the receivers, transmitters, and cable used to implement the bus, as well as the complete message transmission protocol. 1553 is designed for high integrity message exchanges between unattended equipment. The messages are generally highly repetitive, and their content and periodicity are all pre-planned.

The United States Department of Defense ("DoD") requires the use of 1553 as the standard for all inter and intra-subsystem communications on all military airplanes, helicopters, ships and land vehicles. Originally used only in mission avionics, 1553 is now used in flight critical avionics, flight control, weapons, electrical power control, and propulsion control. 1553 was originally published in 1973 for use on the F-16 military aircraft program. The current version of 1553 is MIL-STD-1553B ("1553b"), Notice 2, implemented in 1986.

1553 is generally utilized for hard real time communications, where a message is expected to be communicated over the bus in a deterministic way with known latency and very low probability that the message is not decoded successfully. For these critical communications, the standard specifies a primary data bus as well as a redundant (default) bus, providing communications path redundancy ("dual bus redundancy"). For dual redundant bus applications, 1553 requires that a terminal be capable of listening to and decoding commands on both buses at the same time. A 1553 terminal transmits 1553 signals on only one bus at a time. Redundancy can be extended to more than 2 buses.

MIL-STD-1553B utilizes a primitive Manchester II bi-phase signaling scheme over shielded twisted pair cabling. This modulation scheme is bandwidth inefficient, with most of its signal energy concentrated around 1 MHz. MIL-STD-1553b has little remaining capacity for existing applications and leaves little opportunity to enable additional communication capabilities.

The retrofitting of an aircraft to add new equipment, Line Replaceable Units (LRU's) and/or munitions, including new wiring, is a complex process, which can require many months of modification time and involve substantial expenses. When new digital devices are added to an after market military or commercial aircraft, the addition thereof typically requires new bus wiring or an expanded load on the already heavily loaded aircraft wiring cockpit applications. New devices, that may only require minutes to install, often require an entire airframe to be nearly disassembled to allow new wiring runs to the new devices. Furthermore, the new wiring adds weight to the aircraft and takes up space, which is always disadvantageous in any airframe design, especially for high performance airframes in which maneuverability is important.

Furthermore, new equipment, such as LRUs or munitions, which are retrofitted to an airframe often require high bandwidth data links between the new equipment to points in the airframe where control or monitoring is performed. High bandwidth communications between state of the art digital equipments are necessary.

The Society of Automotive Engineers (SAE) Avionics Systems Subcommittee (AS-1A), in cooperation with SBS Technologies Inc., have investigated the use of Discrete Multi-Tone (DMT) signaling as a possible technology to increase the data transfer capacity of existing AS15531 networks. Their findings are summarized in a white paper entitled "The Use of Discrete Multi-Tone (DMT) Signaling for Data Transmissions on Existing AS15531 Networks", published on 15 Aug. 1998, which is incorporated herein by reference. Experimental studies have considered only a point-to-point connection of commercial Digital Subscriber Line (DSL) modems over a 100 ft piece of MIL-C-17 AS155531 cabling. This work indicated that the cable becomes surface impedance unstable and lossy at frequencies above approximately 10 MHz (see p. 5, paragraph 4.3). In addition, test results of standard AS15531 couplers used in this work indicated that the couplers had a band-pass capacity of between 2 and 3 MHz. (see p. 5, paragraph 4.4). Simultaneous DSL and AS15531 traffic was observed in the case of a Multi-rate Symmetrical DSL (MSDSL) modem, however MSDSL telecom modems would begin reporting significant number of errors if the AS15531 transactions were scheduled at frequencies above approximately 10 MHz. In the case of an Asymmetrical DSL (DSL) telecom modem tested, AS15531 bus traffic was detected by the modems and was significant enough to reset the modem link. The study fails to indicate the feasibility of an operable system that would allow existent 1553 networks to operate in their multi-drop, dual-redundant architecture, at a data transfer rate above 1 Mbps and signaling frequencies above approximately 10 MHz.

There is a need for an improved 1553 communication system with a data transfer capacity above 1 Mbps that can be overlaid over an existent 1553 network without rewiring.

SUMMARY OF THE INVENTION

An object of the invention is to provide an improved 1553 data communication system and method of data transmission.

Accordingly, the invention provides a 1553 communication system having a primary bus and a redundant bus, comprising a non-1553 data communications overlay system. The non-1553 data communication overlay system has a non-1553 bus controller terminal and a non-1553 remote terminal. Each non-1553 terminal includes a non-1553 transmitter block, a non-1553 receiver block and a non-1553 receive path selection block. The non-1553 transmitter block is connected to the primary bus and the redundant bus and sends non-1553 signals on these buses. The non-1553 receiver block receives non-1553 signals from one of the buses on a receive path selected by the non-1553 receive path selection block. The non-1553 receive path is selectively established between the primary data bus or the redundant data bus and the non-1553 receiver block according to predefined receive path selection criteria. According to further embodiments, the receive path selection criteria may include monitoring performance metrics for bus conditions such as Bit Error Rate (BER), Signal to Noise Ratio (SNR), channel capacity. Such metrics could be monitored periodically, as well as averaged over appropriate time intervals, according to specific system topologies and communication requirements.

Furthermore, a communication method over a 1553 communication networks is provided. The method comprises the steps of transmitting 1553 signals on a primary bus or on a redundant bus according to a 1553 bus fault design and receiving 1553 signals from the primary and redundant buses. The method further comprises the step of transmitting non-1553 signals over the primary bus and over the redundant bus and the step of selecting a non-1553 receive path between either the primary bus or the redundant bus an a non-1553 receiver. The method also comprises the step of receiving non-1553 signals on the selected receive path. The receive path selection is based on predefined receive path selection criteria.

Advantageously, the invention provides retrofitting an existent 1553 communication system for increased data transfer capacity, without rewiring and with minimal impact to the existent 1553 communications.

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, where.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
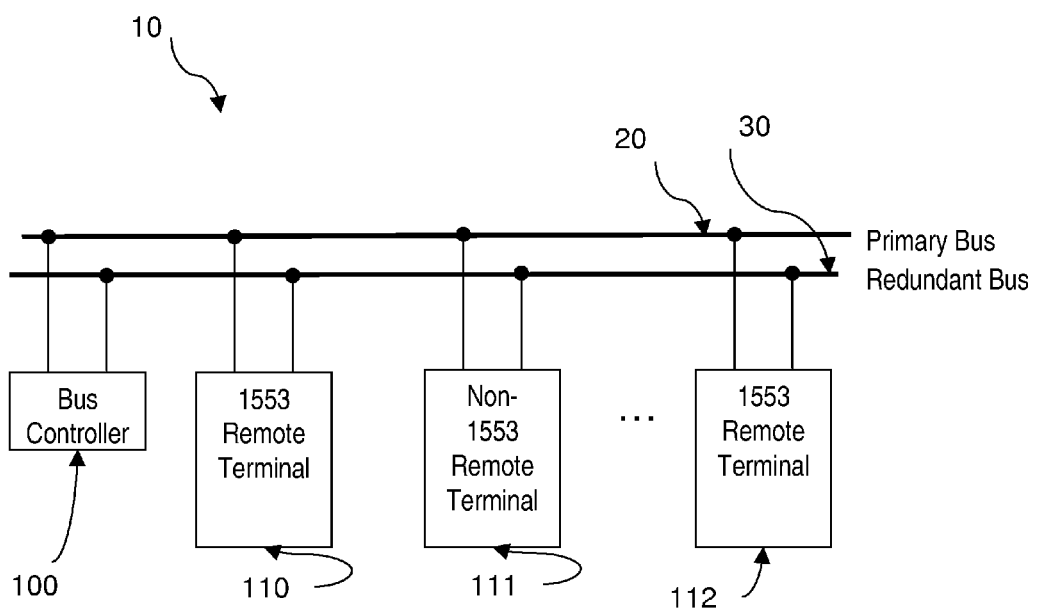
FIG. 1 is a block diagram of a 1553 communication system according to an embodiment of the invention.

Reference is made now to FIG. 1, illustrating a 1553 communication system 10 according to the invention. System 10 comprises a primary data bus 20 and a redundant data bus 30, a Bus Controller (BC) terminal 100 and a plurality of Remote Terminals (RT) 110, 111, 112. 1553 compatible devices are in most cases analog, so in general, each of the Remote Terminals includes a transceiver which converts the binary bit streams on buses 20, 30 to analog signals. The Remote Terminals also comprise encoder/decoder equipment and protocol controllers, as well as other necessary components to interface to any higher layer sub-systems. The Bus Controller 100 is a terminal consisting of a superset of the capabilities of the Remote Terminals 110, 111, 112, acting as the media access controller (MAC) to the buses 20, 30, utilizing a command/response protocol. In embodiments of the invention operable in accordance with the 1553 standard, only the Bus Controller 100 can issue a command on the buses while Remote Terminals only respond to a command received from the Bus Controller 100.

Within the 1553 communication systems 10, Remote Terminal 110, 112 are capable of sending and receiving 1553 signals over the primary and redundant buses 20, 30, whereas Remote Terminal 111 is capable of sending and receiving non-1553 signals. Furthermore, BC 100 is capable of sending both 1553 and non-1553 signals. 1553 signals are defined herein as signals in accordance with 1553 standard signaling schemes, including but not limited to primitive Manchester II bi-phase signaling. Non-1553 signals are any signals that can be differentiated from 1553 signals either in frequency domain, time domain, Laplace domain, or by any other method obvious in the art. Non-1553 signals must be generated so as to enable co-propagation with 1553 signals through an existing 1553 system along the primary and secondary buses 20, 30. Preferably, when co-propagating non-1553 signals, impact to the transmission of the 1553 signals is minimal. Without limitation, Digital Subscriber Line (DSL) code gain methods such as Carrier-less Amplitude/Phase (CAP) coding and Orthogonal Frequency Division Multiplexing (OFDM), closely related to Discrete Multi-Tone (DMT) coding are particular examples of possible non-1553 signals.

Terminals capable of either sending or receiving non-1553 signals, such as 111, are defined herein as non-1553 terminals or non-1553 communication devices. Likewise, terminals capable of receiving 1553 signals, such as 110 and 112, are defined herein as 1553 terminals or 1553 communication devices. It will be recognized by those skilled in the art that 1553 terminals and non-1553 terminals as defined herein are differentiated by their functionality and signaling capabilities, but their implementation may take various forms. Physically, they might be integrated on the same IC or be built on different boards, but also they might occur at different physical locations, all according to requirements of the communication system and to manufacturing preferences. In an alternate embodiment, two distinct BC terminals, one controlling 1553 RT's and the other controlling the non-1553 RT's, might be provided.

Figure 2:
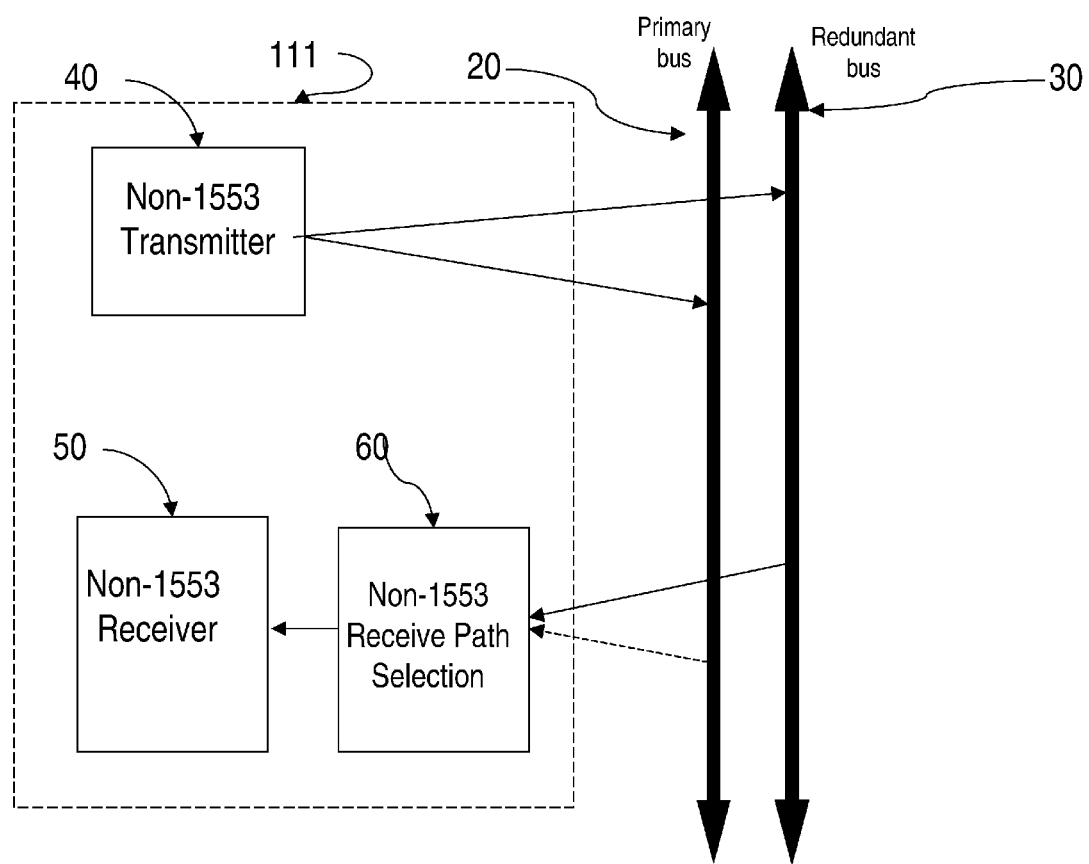
FIG. 2 is a block diagram of a non-1553 terminal for a 1553 communication system according to an embodiment of the invention.

Referring now to FIG. 2, a non-1553 terminal 111 according to an embodiment of the invention is illustrated. The non-1553 terminal 111 comprises a non-1553 transmitter block 40 connected to the primary bus 20 and the redundant bus 30 of a 1553 communication system, for sending non-1553 signals on these buses. The non-1553 terminal 111 also comprises a non-1553 receiver block 50 for receiving non-1553 signals via a receive path to be established with one of the primary bus 20 and the redundant bus 30, by a non-1553 Receive Path Selection block 60. As it will be recognized by someone skilled in the art, the non-1553 Receive Path Selection block 60 comprises means for selecting one of the data buses based on a predefined receive path selection criteria, as well as means for establishing a connection, such as, but not limited to, an electrical connection, between the selected bus and the non-1553 receiver block 50. Predefined receive path selection criteria of selecting a non-1553 receive path are defined herein as any design criteria aimed at indicating the appropriate receive path, from a plurality of data buses to a non-1553 receiver.

Figure 3:
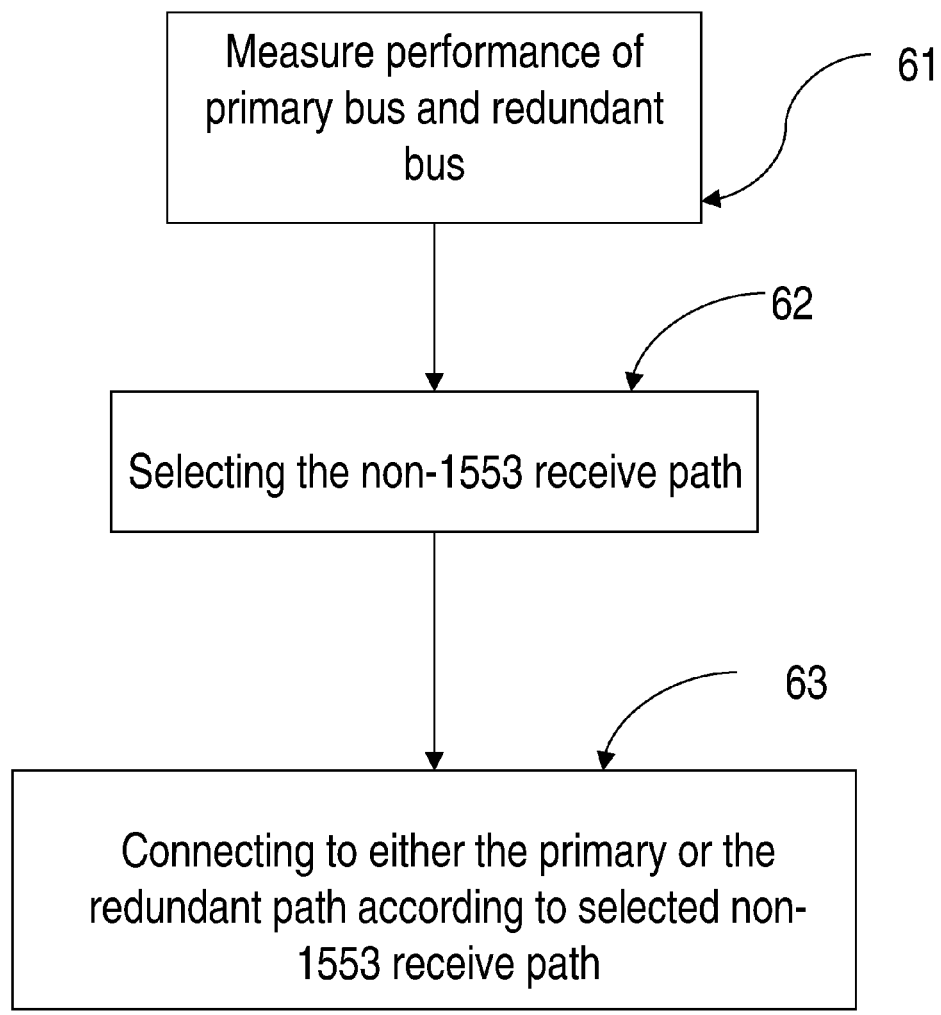
FIG. 3 is a flow chart of a method of selecting a receive path for non-1553 signals within a 1553 communication system in accordance with an embodiment of the invention.

FIG. 3 illustrates the flowchart of a method of receiving non-1553 signals within the 1553 communications system 10, according to an embodiment of the invention. According to this embodiment, the method comprises the step of monitoring the performance of the primary bus 20 and of the redundant bus 30, as shown at 61. Preferably, the monitoring step is performed periodically, based on metrics that may include, without limitation, Signal to Noise Ratio (SNR), Bit Error Rate (BER), channel capacity etc. Based on the values obtained during the monitoring step, preferably averaged over appropriate time intervals, a selection of an appropriate receive path, from the primary bus to the receiver or from the redundant path to the receiver, as shown at 62, is made. Finally, once a receive path is selected, the connection between the corresponding bus and the non-1553 receiver is established, step 63, allowing for non-1553 signals to be received at the non-1553 receiver 50.

According to a preferred embodiment, the higher performance bus will be selected as the bus from which to receive signals. For example, under no-bus fault conditions, 1553 signals might be transmitted on the primary bus, leaving the redundant bus available for unfettered transmission of non-1553 signals. When the same bus must be used for both 1553 and non-1553 signals, a multiplexing scheme such as Time Division Multiplexing might be used, although this may not be necessary.

Figure 4:
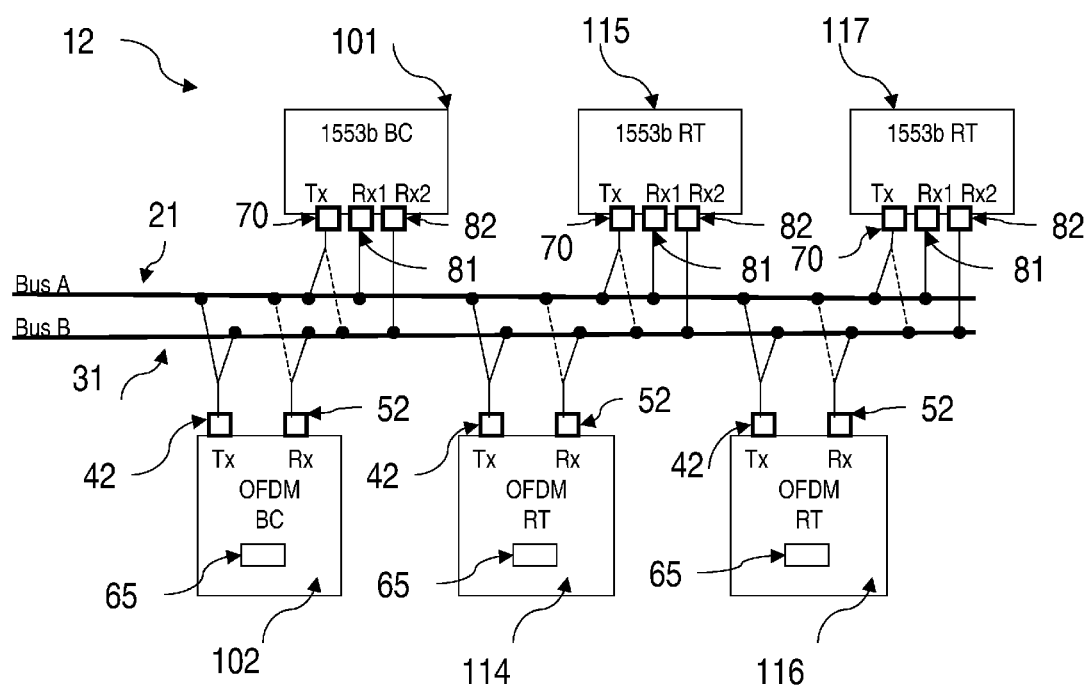
FIG. 4 is a block diagram of a 1553 communication system, according to a preferred embodiment of the invention.

FIG. 4 illustrates a 1553b communications system 12 according to a preferred embodiment of the invention. The 1553b communication system 12 is built and operates in accordance to the 1553b standard. The 1553b communication system 12 comprises a primary bus (Bus A) 21 and a redundant bus (Bus B) 31, a 1553b Bus Controller (BC) 101 and a plurality of 1553b Remote Terminals (RT) 115, 117 exchanging 1553b signals along buses 21, 31. In addition, the 1553b system 12 comprises an OFDM Bus Controller 102 and a plurality of OFDM Remote Terminals 114, 116.

Each 1553b terminal comprises a 1553b Transmitter 70, connecting via a switch to either the primary bus 21 or the redundant bus 31, and a couple of 1553b receivers 81, 82. Each OFDM terminal comprises an OFDM Transmitter 42, connected to the primary bus 21 and to the redundant bus 31, and an OFDM receiver 52 that can connect via a switch to either bus.

Figure 5:
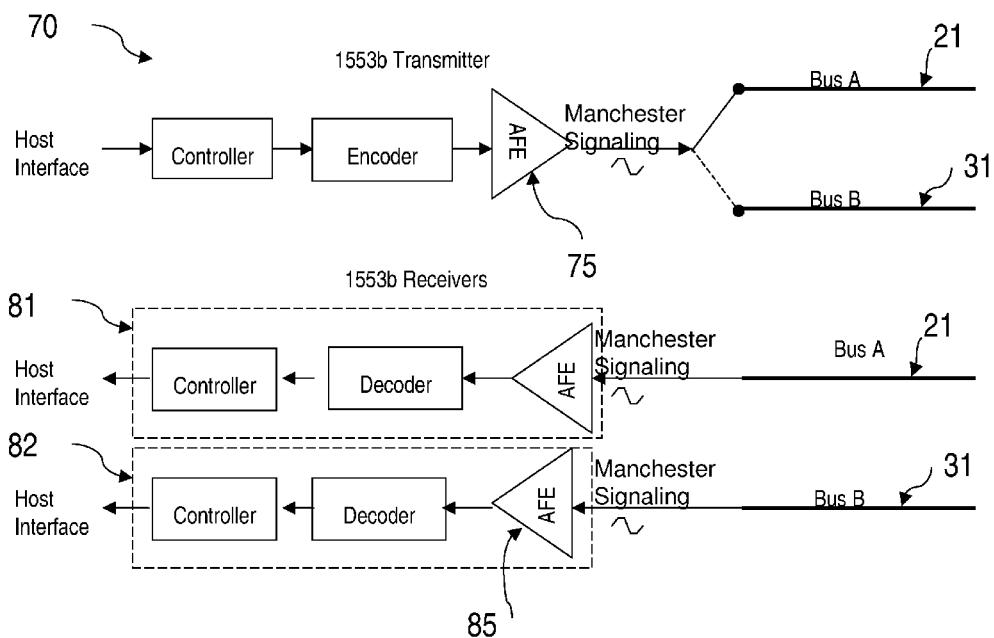
FIG. 5 is a block diagram of a 1553b terminal, used within the system shown in FIG. 4.

FIG. 5 shows a detailed block diagram of a 1553b terminal in the 1553b system 12. The 1553b transmitter 70 comprises a controller block, an encoder, and an analog front end (AFE) block, containing all the circuitry for filtering, for converting the signal from digital to analog and for coupling the signal to the primary bus (Bus A) or the redundant bus (Bus B) via a switch. Each 1553b receiver 81, 82 comprises an AFE block performing necessary filtering and conversion from analog to digital, a decoder block, and a controller block.

Figure 6:
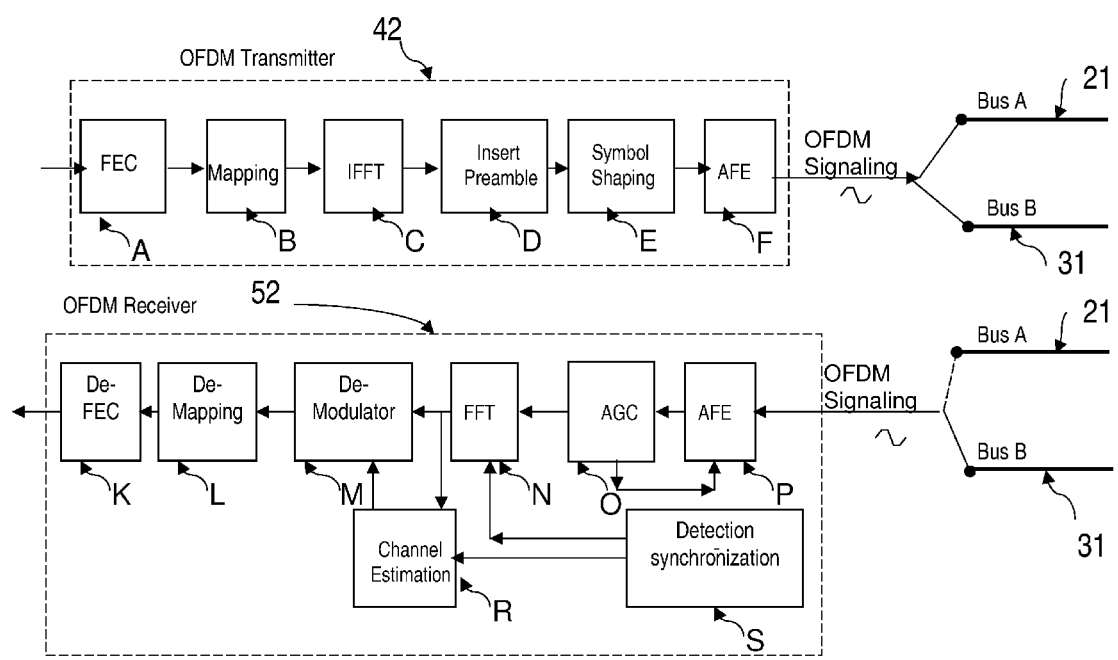
FIG. 6 is a block diagram of an OFDM terminal used within the system shown in FIG. 4.

FIG. 6 illustrates an OFDM terminal according to a preferred embodiment of the invention. The OFDM Transmitter 42 includes a forward error correction (FEC) unit A for adding FEC bits to an input data bit stream. Forward Error Correction (FEC) may consist of Reed-Solomon, convolutional or other types of coding schemes that will be recognized by someone skilled in the art. The FEC unit A is followed by a mapping block B which maps the encoded bits to frequency domain sub-carriers, which are then transformed to a time domain digital signal (symbol) by an inverse Fast Fourier Transform (IFFT) unit C, which will be recognized by those skilled in the art as means for an efficient implementation of the inverse discrete Fourier Transform (DFT) algorithm. Preferably, the number of bits that are allocated to particular tones is chosen to match the signal to noise conditions of the channel.

The symbols are then received by a preamble unit D, which pre-pends to them a preamble, consisting of a number of synchronization symbols. The preamble allows for synchronization of the transmitted waveform at the receiver, as well as to enable analog gain control (AGC) and channel response estimation. Furthermore, a cyclic prefix is also usually added to the OFDM symbols. Next, the symbols are appropriately shaped by a symbol shaper E before conversion to an analog signal by the analog front end (AFE) F. The symbol shaping may include operations such as widowing and filtering. Following, the OFDM symbols represented as digital signals are converted to analog signals by the analog front end (AFE) F, comprising a digital to analog converter and appropriate analog filters. The AFE may further include an IF/RF mixing stage to convert the signal to higher frequencies.

The OFDM Receiver 52 selects the analog signal from the primary bus 21 or redundant bus 31, as discussed above. Then, the appropriate RF/IF stages are used to convert the signal to a baseband signal which is then filtered and converted from the analog domain to a digital signal by an analog front end (AFE) which includes an analog to digital converter P. An Automatic Gain Control block (AGC) O controls the input signal level based on power metrics estimated from the synchronization symbols. A Fast Fourier Transform (FFT) is applied to the sampled signal by an FFT block N, preferably with the timing of the FFT based on the detection and timing estimation of the synchronization symbols performed by a Detection Synchronization block S. Channel estimation is achieved based on the synchronization symbols and is used by a De-Modulator M to remove phase and amplitude distortion effects of the channel. Channel equalization is next performed in the frequency domain. A De-Mapping function L converts the demodulated frequency domain sub-carriers to coded data bits, followed by the corresponding forward error correction block R to correct any bit errors (if correctable). The decoded data bits are passed to higher communications layers.

Figure 7:
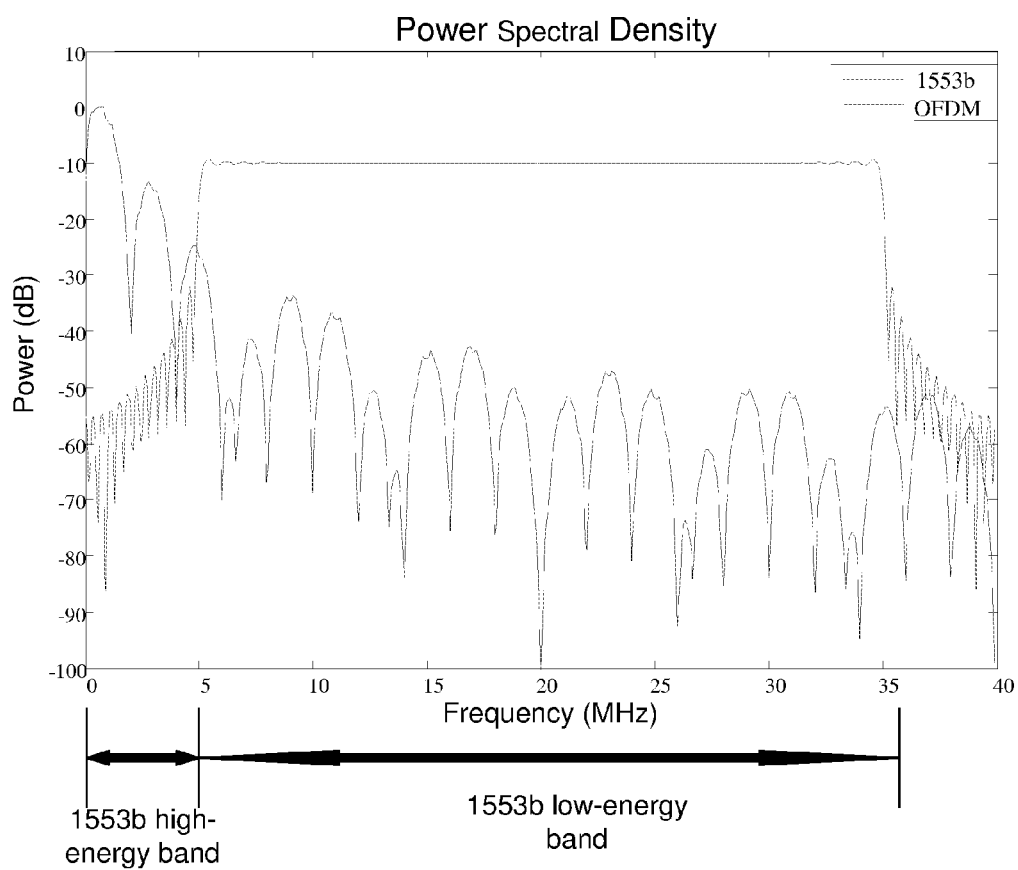
FIG. 7 illustrates a theoretical Power Spectral Density (PSD) plot of an OFDM signal and a 1553b signal within a 1553b communication system in accordance with an embodiment of the invention.

According to the preferred embodiment of the invention, OFDM modulation is used to better utilize the available bandwidth on the bus, creating an "overlay" network to operate concurrently and without disturbing existing 1553b communications. This is accomplished by utilizing OFDM signals with little energy (low PSD) in a 1553b high-energy frequency band and with a relatively constant Power Spectral Density (PSD) in 1553b low-energy frequency band. FIG. 7 is a theoretical representation of the PSD of a transmitted OFDM signal relative to a 1553b transmitted waveform. As illustrated, the OFDM waveforms are configured to utilize the frequency band from 5 to 35 MHz where 1553b side lobes of a given 1553b system are relatively low. In addition, the OFDM signals have little energy in the 0 to 5 MHz band. Therefore, interference between OFDM communications and existing 1553b communications is minimized. Alternate embodiments contemplate configuration of OFDM signals with different frequency bands, including an OFDM waveform configured to utilized the frequency band from about 5 MHz to a frequency greater than 35 MHz, such as 40 MHz.

Figure 8:
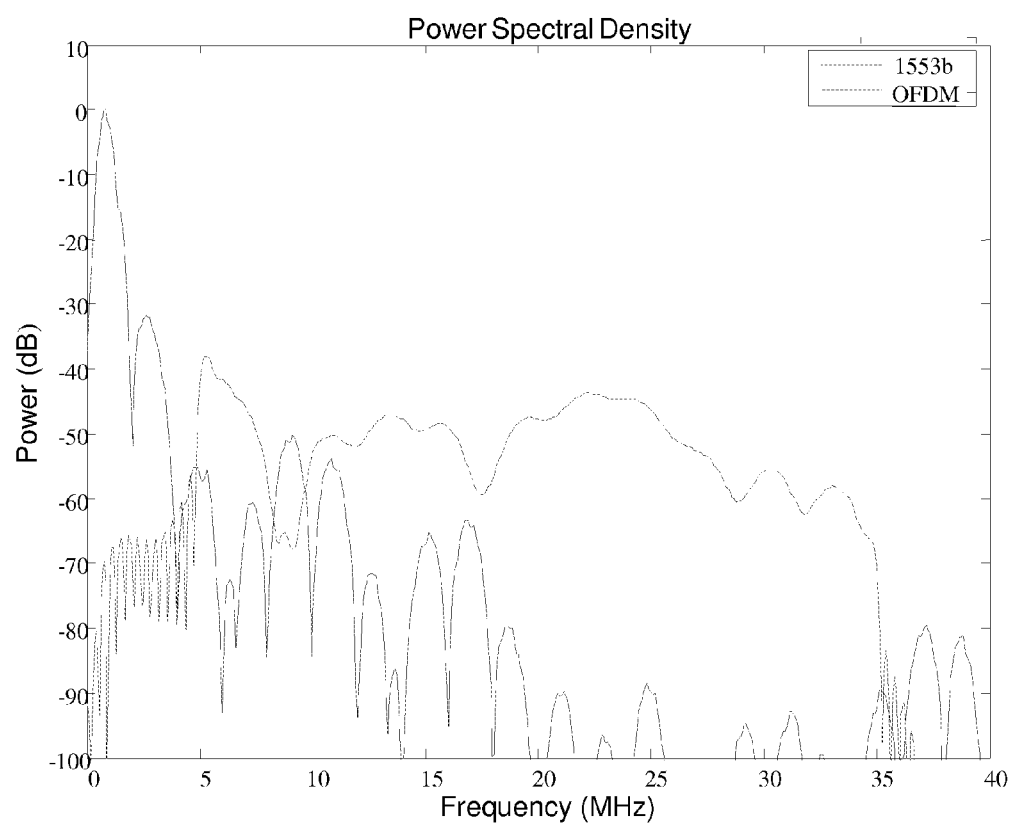
FIG. 8 is a Power Spectral Density (PSD) plot of an OFDM signal and a 1553b signal within a particular 1553b communication system in accordance with an embodiment of the invention.

FIG. 8 illustrates representative PSD's at a receiver of both a 1553b signal and OFDM signal for a particular bus configuration. In this example, the Signal to Noise Ratio (SNR) has an acceptable level in the frequency band below 5 MHz for a 1553b receiver to decode the 1553b signal. As well, the SNR has an acceptable level in the frequency band above 5 MHz for an OFDM receiver to decode the OFDM signal. It will be understood by those skilled in the art of data communications that the frequency and bandwidth of the OFDM communications devices can be chosen to match the channel conditions of a given 1553b bus to ensure reliable communications for both 1553b and OFDM systems.

When both 1553b and OFDM signals are transmitted on the same bus, relative powers at a receiver would depend on the network topology and the particular locations of transmitters and receivers. A network of this topology and components is generally frequency selective in nature. A transceiver is generally transformer coupled to the bus stub (cable connection to the main bus) and the connecting stubs can be either transformer coupled or direct coupled using isolation resistors only to the main bus.

Referring back to FIG. 4, bus fault design is herein defined as predefined operation of the communication system in the event of bus faults. Examples of bus faults include, without limitation, a broken wire or connector or an issue with a terminal itself. A dual redundant scheme of 1553b communication over system 12 is as follows: 1553b devices transmit on Bus A under no bus fault conditions and receive from both Bus A and Bus B. Each OFDM device transmits the same signal on both Bus A and Bus B and receives on Bus B under no bus fault conditions. When bus faults occur on Bus A 1553b devices will switch to Bus B for transmission, under BC control. In most 1553b applications, a bus fault is determined on a terminal by terminal basis; however, other bus fault detection designs are not excluded. When the 1553b BC 101 detects that one of the 1553b RT's does not respond on the primary bus 21, it re-sends the command to that RT to transmit on the redundant bus 31. Occasionally, the 1553b BC may also send a command on the redundant bus 31 to test the integrity of the wire.

In order to select a receive path, the OFDM receiver 52 of the OFDM device 114, while connected to the secondary (redundant) bus 31, periodically monitors the secondary bus for performance via non-1553 receive path selection unit 65. The monitoring is performed based on a predefined design scheme or predefined selection criteria, specifying acceptable performance level for selected metrics. The metrics used for this determination can include but are not limited to SNR, Bit Error Rate and capacity. The metrics could be monitored and averaged over an appropriate time interval. Detection of performance of the redundant bus below acceptable levels, triggers switching the connection of OFDM receiver 52 from the secondary bus 31 to the primary bus 21, thus establishing an alternate receive path. Switching to the other bus could also be initiated by failing to decode a message on the currently connected bus. Alternately, both buses could be monitored at the same time, and a receive path between the better performing bus and the receiver could be established accordingly, as described earlier in reference to FIG. 3 (see step 61).

In summary, embodiments of the present invention allow for an overlay of a non-1553 communication scheme over legacy 1553 systems, with minimal impact to the 1553 communications, thereby providing the ability of enhancing the throughput of existent 1553 systems and of adding new digital equipment, without rewiring.

Furthermore, a dual-redundant scheme employing a single non-1553 transmitter and single non-1553 receiver per non-1553 transceiver is presented. Therefore, additional benefits compared to 1553b dual redundancy architecture include lower power, smaller size, less heat dissipation requirements and lower design complexity. It will be obvious to those skilled in the art of data communications that the dual redundant architecture in FIG. 4 may scale to more than 2 buses.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. Within a 1553 data communication system having a primary data bus and a redundant data bus, an OFDM data communication overlay system comprising:
   an OFDM bus controller terminal and an OFDM remote terminal, wherein each OFDM terminal includes:
   an OFDM transmitter block connected to the primary bus and the redundant bus for sending OFDM signals;
   an OFDM receiver block for receiving OFDM signals; and
   an OFDM receive path selection block for selectively establishing a receive path between the primary data bus or the redundant data bus and the OFDM receiver block according to predefined receive path selection criteria,
   wherein the OFDM signals are Power Spectral Density (PSD) configurable according to the topology of the 1553 data communication system and are configured to have a low PSD in a 1553b high energy frequency band and a substantially flat high PSD in a 1553b low energy frequency band.

2. The OFDM data communication overlay system of claim 1, wherein the OFDM data communication system comprises a plurality of OFDM remote terminals communicating with the OFDM bus control terminal over one of the primary data bus and the redundant data bus.

3. The OFDM data communication overlay system of claim 1, wherein the 1553 data communication is according to MIL-STD-1553B communication standard.

4. The OFDM data communication overlay system of claim 1, wherein the 1553 data communication is according to Notice 2 of MIL-STD-1553B communication standard.

5. The OFDM data communication overlay system of claim 1, wherein said OFDM signals are bandwidth configurable according to channel conditions of the 1553 data communication system.

6. The OFDM data communication overlay system of claim 1, wherein said 1553b high energy band is from approximately 0 MHz to approximately 5 MHz.

7. The OFDM data communication overlay system of claim 1, wherein the OFDM signals have a substantially high flat PSD from approximately 5 MHz to a frequency approximately equal to or greater than 35 MHz.

8. The OFDM data communication overlay system of claim 1, wherein said receive path selection criteria include performance metrics of said OFDM signals on said buses.

9. The OFDM data communication overlay system of claim 8, wherein said performance metrics include one or more of Bit Error Rate (BER), Signal to Noise ratio (SNR), channel capacity metrics.

10. The OFDM data communication overlay system of claim 9, wherein the OFDM receive path selection unit monitors performance metrics of said OFDM signals periodically.

11. The OFDM data communication overlay system of claim 9, wherein the OFDM receive path selection unit further averages monitored performance metrics of said OFDM signals over predefined time intervals.

12. A 1553 data communication system comprising:
a primary data bus;
a redundant data bus;
A 1553 bus controller terminal and a plurality of 1553 remote terminal, each 1553 terminal comprising:
   A 1553 Transmitter block;
   an analog switch, for selectively connecting the 1553 transmitter block either to the primary bus or to the redundant bus according to a predefined receive path selection criteria and according to bus fault design;
   a first 1553 receiver block for receiving 1553 signals from the primary bus, under no-bus fault conditions; and
   A second 1553 receiver block for receiving signals from the redundant bus under bus-fault conditions;
an OFDM bus controller terminal and a plurality of OFDM remote terminals, each OFDM terminal comprising:
   An OFDM transmitter block connected to the primary bus and the redundant bus for sending OFDM signals on the primary bus and on the redundant bus;
   An OFDM receiver block; and
   an OFDM receive path selection block for monitoring the performance of the primary bus and of the redundant bus and for establishing a receive path between the OFDM receiver block and either the primary bus or the redundant bus based on performance metrics.

13. The 1553 data communication system as in claim 12, wherein the OFDM signals are bandwidth configurable and PSD configurable OFDM signals, wherein the bandwidth and PSD of OFDM signals are configured according to channel conditions of the primary bus and of the redundant bus.

14. The 1553 data communication system as in claim 12, wherein the performance monitoring comprises periodically determining metric values, wherein metrics are selected from the group of SNR, BER, capacity and averaging said metric values over a predetermined time interval.

* * * * *